United States Patent [19]

Matsumoto

[11] Patent Number: 4,728,996
[45] Date of Patent: Mar. 1, 1988

[54] PHOTOGRAPHIC PRINTING METHOD

[75] Inventor: Fumio Matsumoto, Tokyo, Japan

[73] Assignee: Fuji Photo Film Co., Ltd., Kanagawa, Japan

[21] Appl. No.: 51,565

[22] Filed: May 20, 1987

[30] Foreign Application Priority Data

May 20, 1986 [JP] Japan .................. 61-115880

[51] Int. Cl.⁴ .............................. G03B 27/32
[52] U.S. Cl. ........................ 355/77; 355/41; 355/68
[58] Field of Search ............ 355/38, 41, 68, 77; 354/106; 250/201, 215, 559, 561, 571

[56] References Cited

U.S. PATENT DOCUMENTS

| | | | |
|---|---|---|---|
| 3,867,030 | 2/1975 | Tanaka | 355/41 |
| 4,239,384 | 12/1980 | Treiber | 355/68 |
| 4,523,839 | 6/1985 | Payrhammer et al. | 355/68 |
| 4,542,984 | 9/1985 | Shiota et al. | 355/68 |
| 4,610,537 | 9/1986 | Matsumoto | 355/68 |
| 4,611,907 | 9/1986 | Inatsuki | 355/41 |
| 4,641,019 | 2/1987 | Inatsuki | 354/106 X |
| 4,650,316 | 3/1987 | Matsumoto | 355/68 X |
| 4,653,900 | 3/1987 | Kito et al. | 355/41 X |
| 4,660,965 | 4/1987 | Matsumoto | 355/41 |

Primary Examiner—Richard A. Wintercorn
Attorney, Agent, or Firm—Sughrue, Mion, Zinn, Macpeak & Seas

[57] ABSTRACT

In the prior art photographic printing systems, the correspondence between imaged frames of 135 type size film and printed sheets of photographic paper is not clearly made, which presents problems when a particular frame should be re-printed for make-over at the laboratory or for extraprints ordered by a customer as it is difficult to distinguish one frame from another in images. Even if frames are attached with numbers at a printing step, the frame number is hard to read with eyes. Frames different from the desired one are often printed for re-print to thereby waste time and photographic paper. This invention method enables correspondence of imaged frames of film with printed sheet of photographic paper by automatically obtaining identification information of printed frames based on the frame number and feeding direction which are initially set for each mounted film. This facilitates reference between printed sheets of photographic paper and imaged frames of an original film to thereby remarkably reduce mistakes in printing of extra prints or re-printing for make-over which might otherwise be caused by confusion of numbers.

13 Claims, 11 Drawing Figures

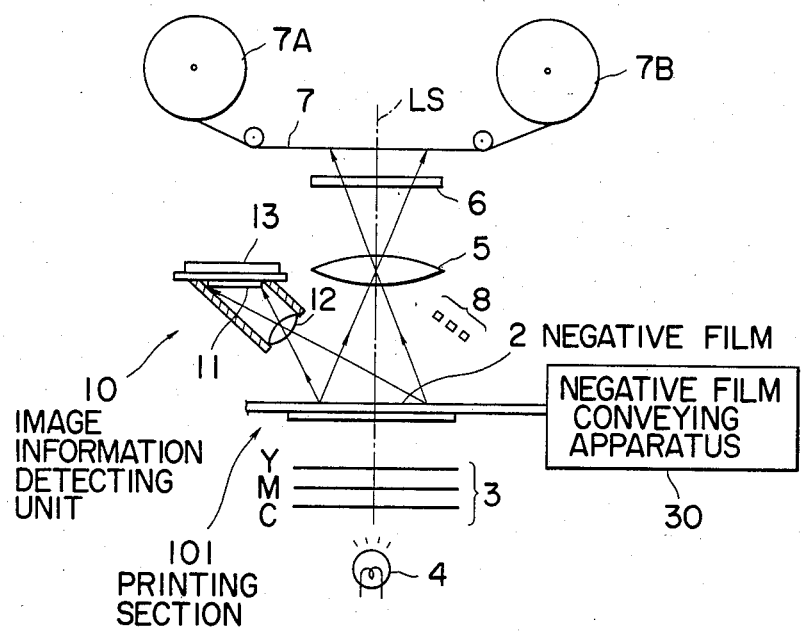
FIG. 1
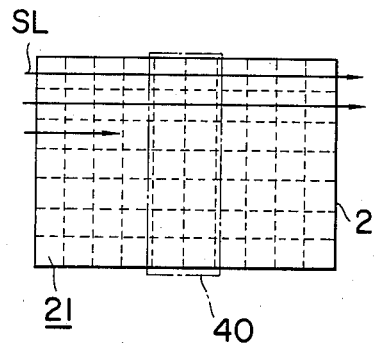
FIG. 2A
| 16 | 59 | 58 | 55 |   | 43 | 31 |
| 12 | 57 | 56 | 55 |   | 58 | 13 |
| 17 | 55 | 55 | 51 |   | 56 | 16 |
| 15 | 52 | 52 | 47 |   | 53 | 20 |
| 14 | 49 | 48 | 46 |   | 49 | 23 |
| 12 | 47 | 46 | 45 |   | 49 | 27 |
|  5 | 17 | 17 | 16 |   | 45 | 30 |
FIG. 2B

PHOTOGRAPHIC PRINTING METHOD

BACKGROUND OF THE INVENTION

This invention relates to a photographic printing method which can obtain identification information on frames of an original film such as a sheet of negative film of which images are being printed in order to corelate imaged frames with photographic paper to be printed.

It is necessary to precisely position imaged frames of an original film on an optical frame in photographic printing systems in order to appropriately print images in a frame of the original film on a sheet of photographic paper. In the prior art, the original film is notched on the side and the notched portions are detected by an optical sensor to position it in a proper relation especially in the case of 110 type size or 126 type size where frames and perforations can be corresponded in 1:1 positional relation. However, the notches should be made precisely at right positions to frames, requiring formidable efforts. The frames can be positioned by constantly advancing the original film by a constant distance, but this method is detrimental as deviations from the right positions tend to accumulate and deteriorate the precision.

In the conventional photographic printing method, the correspondence between images in a frame of the original film and in a printed sheet of the photographic paper is not clearly defined. This presents problems particularly when the images in adjacent frames are similar as it is extremely difficult to distinguish one printed sheet from another when reprinting of a particular frame is required for make-over in the laboratory or when customers later want extra prints. Further, while images of the frames are being printed at the laboratory, it is extremely difficult in the prior art to read the frame numbers with eyes because of the masks present around a negative film carrier to thereby often cause mistakes and confusion. A wrong frame sometimes is printed thus wasting time and the photographic paper. Attempts have been made to record numbers corresponding to the frames of the original film on the photographic paper, but they have not yet been put into practice as detection and identification are difficult in the case of size of 135 type and those other than the case like 110 or 126 type size where the frame numbers attached in latent image correspond to perforations in 1:1 positional relation.

SUMMARY OF THE INVENTION

This invention was contrived to eliminate aforementioned problems in the prior art and aims at providing a photographic printing method which can be simply constructed and can detect the image information on the original film such as a sheet of negative film, automatically position the imaged frames by determining the feeding distance from the size information and the edge detection information of the original film, obtain identification information in correspondence to the printed frames and correspond the imaged frames of the original film with the printed photographic paper.

According to one aspect of this invention, for achieving the objects described above, there is provided a photographic printing method which automatically conveys an original film mounted on a negative film carrier by detecting frames for printing which is characterized in that number of the frames is either added or subtracted in accordance to the edge detection information for the imaged frames to obtain identification information for each of the frames so that the imaged frames of said original film are corresponded to printed sheets of photographic paper.

According to another aspect of this invention, there is provided a photographic printing method which automatically conveys an original film mounted on a negative film carrier by detecting frames for photographic printing which is characterized in that an instruction of either addition to or subtraction from a first frame number and feeding direction is inputted as initial setting every time a new film roll is mounted, identification information corresponding to printed frames are obtained by either adding to or subtracting from the first frame number for each the original film based on the information on detected edges of said original film as well as on the information on said feeding direction so that the frame numbers recorded on the side of said original film corresponding with printed sheets of photographic paper with the same numbers.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a structural view of this invention method applied to a photographic printing system;

FIGS. 2A and 2B are explanatory views to show an example of correspondence between segmentation of picture elements of the original film and stored data;

DESCRIPTION OF THE PREFERRED EMBODIMENTS

Figure 3A:
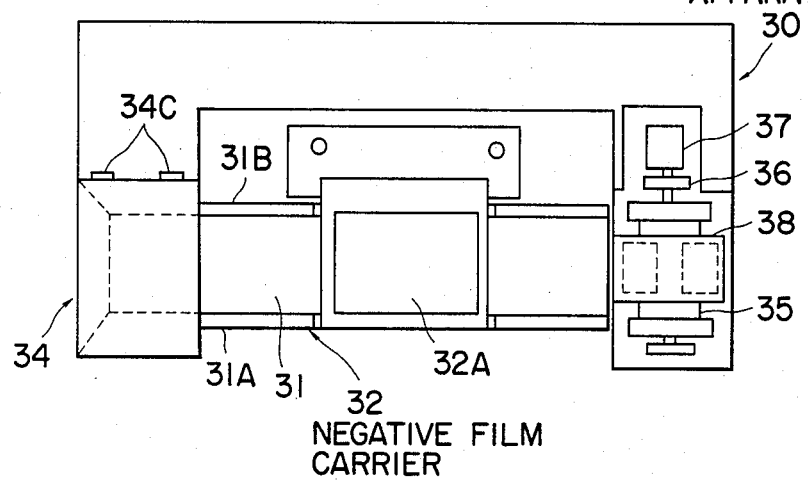
FIGS. 3A and 3B are a plane view to show details of a printing section and a side view thereof, respectively.

According to this invention method, a negative film 2 is segmented into a large number of picture element arrays and image information are detected therefrom with an image information detecting unit 10 which incorporates a two-dimensional image sensor 11 of an area scanning type comprising CCD (Charge Coupled Device), for example, and which is operatively provided near the negative film 2 as shown in FIG. 1. More particularly, when predetermined driving signal is fed to the image sensor 11 from a driving circuit (not shown), the two-dimensional image sensor 11 receives the light transmitted through the negative film 2 placed on a printing section 101 via a lens unit 12, and scans the whole surface of the negative film 2 in arrays of a large number of small picture element 21 as shown in FIG. 2A sequentially along the scanning lines SL. As the frame is being scanned, image signals are outputted sequentially from an output register of the image sensor 11, and the image signals are sampled-held by a samle-holding circuit, and the sampled values are converted into digital signals by an A/D ( analog-to-digital ) converter. The digital signals from the A/D converter are converted into logarithm by a logarithmic converter and expressed in density signals. The density signals are controlled by a write-in controller to be stored in a memory in arrays corresponding to the picture elements 21 as shown in FIG. 2B and in density digital values (or anti-logarithmic values obtained by the above steps excluding the logarithmic converter) of the negative film 2.

Figure 3B:
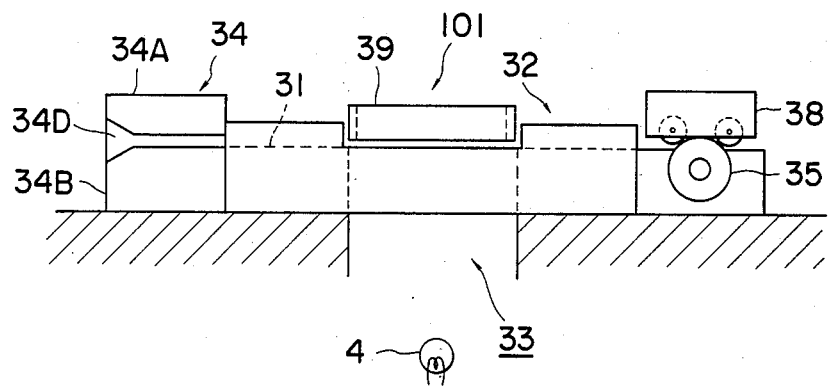

The negative film 2 is consecutively conveyed to the printing section 101 by a negative film conveying apparatus 30. The negative film conveying apparatus 30 is provided at the center of a conveying path 31 thereof with a negative film carrier 32 having a rectangular aperture 32A of the size corresponding to the size of the negative film as shown in FIGS. 3A and 3B. The negative film is adapted to be conveyed between the conveying path 31 and a pressing plate 39. On both sides of the conveying path 31 are erected guide walls 31A and 31B which guide the movement of the negative film, and a hole 33 is bored immediately below the negative film carrier 32 for receiving the light from a light source 4. A guide member 34 comprising an upper plate 34A and a bottom plate 34B is provided at the inlet portion of the conveying path 31 in order to smoothly direct the negative film by holding the negative film therebetween, and the upper plate 34A may be opened/closed on hinge members 34C. At an outlet portion for film of the conveying path 31 is provided a negative film driving roller 35 which engages the negative film for conveyance after the film is printed at the printing section 101. The driving roller 35 is operatively rotated by a motor 37 via a speed reduction gear 36, nipping rollers 38 comprising a pair of rollers are provided above the driving roller 35 in order to smoothly engage and convey the negative film. The nipping rollers 38 are also openable upward with hinge members (not shown).

In the printing system having the aforementioned structure, the negative film to be printed is guided from an aperture 34D of the guiding member 34, conveyed on the path 31 to go through the aperture 32A of the negative film carrier 32 to finally reach the terminal of the conveying path 31, and engaged with the driving roller 35 via the nipping rollers 38 to be carried out.

Figures 4A, 4B:
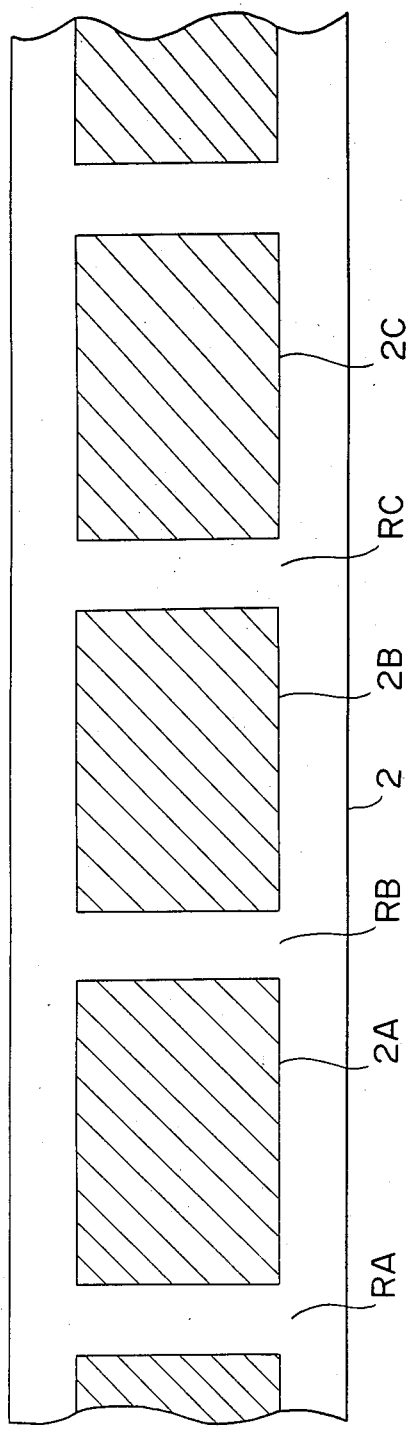
FIGS. 4A and 4B are views to show an embodiment of image information in a memory.

When the negative film 2 is carried to the printing section 101 for printing, it is necessary to precisely position the imaged frames 2A, 2B, 2C, . . . on the negative film carrier 32 as shown in FIG. 4A. After images on a frame are printed, the negative film 2 is conveyed by one frame so as to position the next frame for printing. In the prior art, the negative film 2 is notched in advance on sides thereof with a notcher in order to register the frames with prescribed positions. An attempt was made to detect/suspend the imaged frame by the size information as well as by the steps of detecting the image information from the negative film 2 as shown in FIG. 4A with the image sensor 11 in the unit of picture elements as shown in FIG. 4B, detecting the imaged frames 2A, 2B, 2C, . . . from the image information and detecting unimaged areas RA, RB, RC, . . . between adjacent imaged frames and edges between an imaged frame and an unimaged portion. However, if all the detected information are used for detection/suspension of the imaged frames, it would take too much time for calculation thereof, and especially when the processing is conducted at high speed, the capacity of a micro-computor and so on need to be enhanced to thereby inevitably push up the manufacturing cost of the system. As shown in FIG. 2A, a singular or plural linear picture element array(s) 40 which perpendicularly intersect(s) the direction of the negative film 2 at the center of the two-dimensional image sensor 11 is (are) electrically extracted and the edges between imaged frames are detected by these picture element arrays 40.

Figure 5:
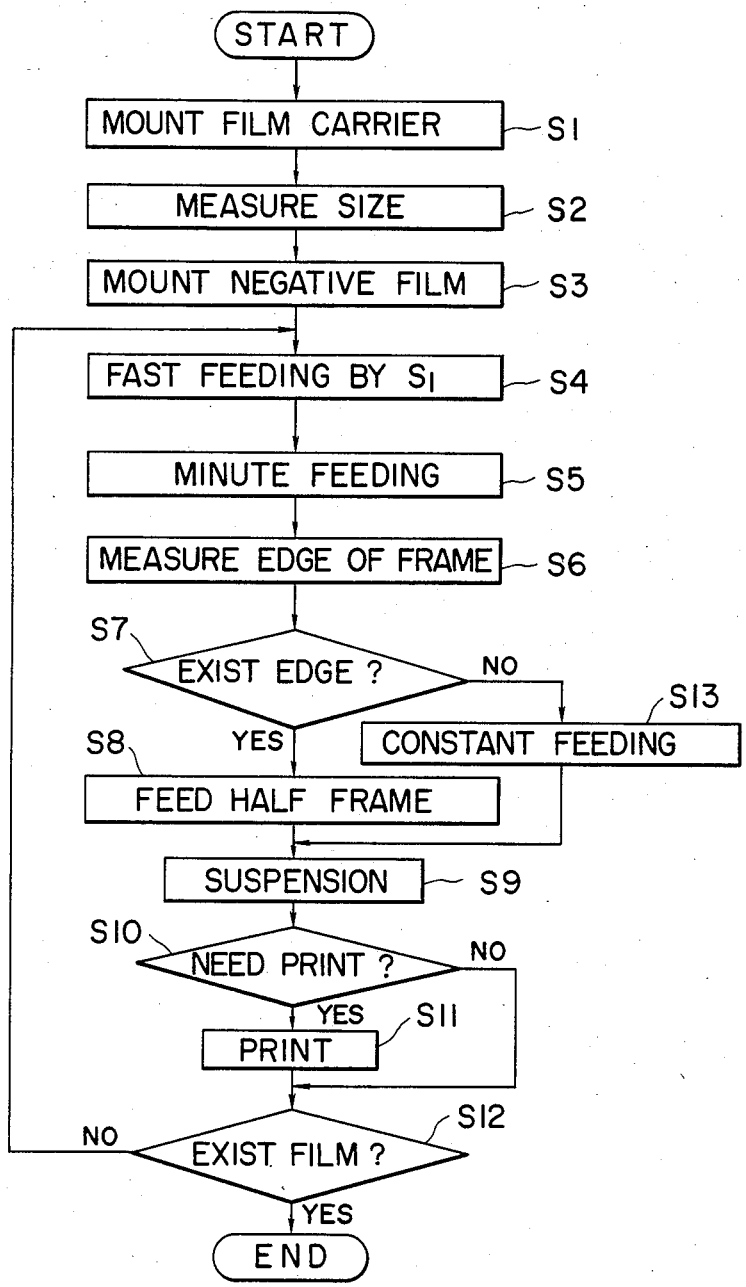
FIG. 5 is a flow chart to show an example of operation according to this invention method.

FIG. 5 is a flow chart to show an embodiment of the detection/suspension method for the imaged frames wherein the negative film carrier 32 of the size suitable for negative film size is mounted at a predetermined position at the printing section 101 (Step S1), and the size of an operative 32A of the negative film carrier 32 is measured with the image sensor 11 according to the method disclosed, for instance, in Japanese Patent Laid-open No. 151626/1985 (Step S2). The size may be measured with eyes and inputted manually. With the data obtained from the measurement, the conveying distance of the negative film 2 is determined, the picture element array(s) 40 is automatically and selectively extracted, and/or exposure or correction in printing is controlled.

Figure 6:
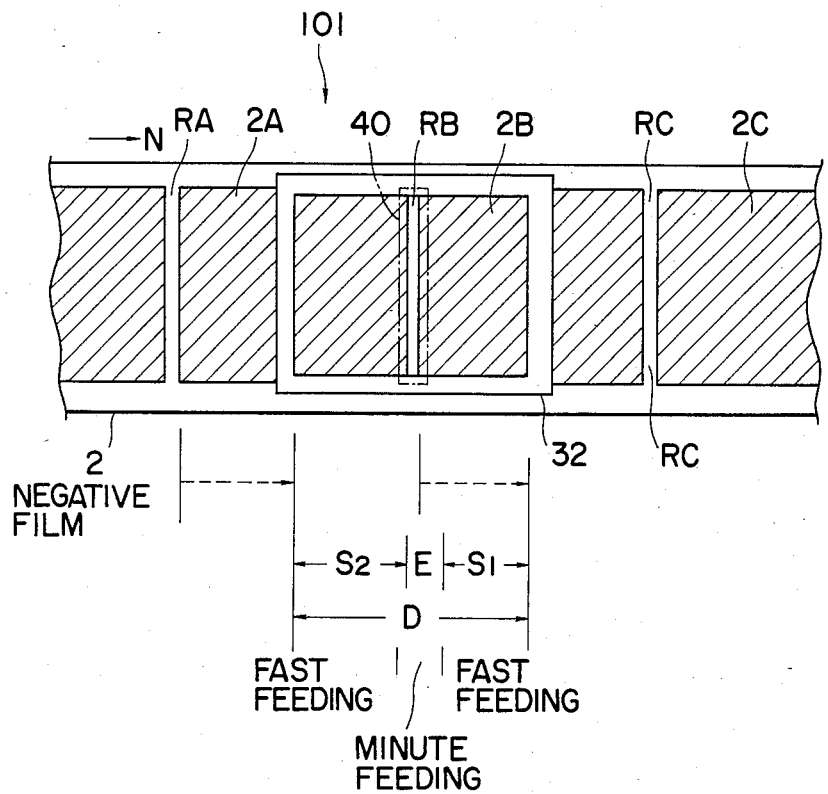
FIG. 6 is a view to show the state on a negative film carrier.

The negative film 2 is then mounted at a position where an unimaged frame at the tip end of the negative film substantially corresponds to the aperture 32A of the negative film carrier 32 (Step S3), and when the tip end of the negative film 2 is engaged in a negative film driving roller 35, a motor 37 is operatively actuated to move the negative film 2 by the distance $S_1$ slightly less than the interval D between the frames at fast speed (Step S4). The negative film 2 is then conveyed at minute pitches and at slower speed (Step S5). Meanwhile the image information is detected by the image sensor 11 to obtain the information for each picture elements as shown in FIG. 4B. As is obvious from the relation between FIG. 4A and FIG. 4B, because there generally is a conspicuous difference in density between the imaged frames 2A,2B,2C, . . . and unimaged portions between the frames RA,RB, RC, . . . , the imaged frames, the unimaged portions and edges therebetween can be respectively detected by detecting in the picture element arrays 40 of the image sensor 11 an area within a predetermined scope which has the density values less than a predetermined value. The value changes drastically in the lateral direction and remains within a predetermined scope in the vertical direction (or the direction perpendicular to the conveying direction of the negative film 2). FIG. 6 shows such a state wherein the negative film 2 is being advanced in the direction N toward the printing section 101 of the negative film carrier 32, and an edge between the imaged frame 2A and the unimaged portion RB is being detected in the picture element array 40 of the image information detecting unit 10. The array 40 of the image sensor 11 is adapted to come at the center of the aperture of the negative film carrier 32. Although the width of the unimaged portion between frames is illustrated wider than it is for convenience's sake, the actual width is in the magnitude which can be detected from the negative film 2 by a sensor having a relatively low resolution of several millimeters. When a sensor having a low resolution is used for edge detection, since the density changes only gradually from the unimaged portion to imaged portion, an edge is detected by detecting the inversion of the direction of changes (or the position where change becomes zero) with the information on relative difference of relative ratio between adjacent picture element arrays or changes in series while conveying the negative film 2 at minute pitches in the order of 0.1 mm.

Until the time when the edge is detected, the negative film 2 is kept moving at minute pitches (Step S5), and when an edge between the imaged frame 2A and an unimaged portion RB is detected, the negative film 2 is conveyed at a fast speed by the distance $S_2$ caluculated from the size information obtained at the above Step S2 until the frame is positioned at the printing section 101 (Step S6, S7, S8), and suspended there (Step S9). The distance E from the unimaged portion RB between the imaged frames 2A and 2b which are positioned substantially at the center of the negative film carrier 32 and the position where an edge of the frame 2A is detected is a parameter (a variable) to correct fluctuations in distances. If the negative film 2 is conveyed by the distance $D = S + E + S_2$ in the state shown in FIG. 6, the negative film 2 can finally be suspended precisely at the position appropriately at the printing section 101.

After the above steps of conveying/stopping of the negative film 2, the frame which is being suspended is judged whether or not it is suitable to printing (Step S10), and if it is judged not suitable, the procedure will proceed to the Step S12, and when it is judged suitable, the images of the frame are printed with exposure amount and correction amount determined in advance (Step S11). After printing, whether or not there still is left a length of film is judged, and the negative film 2 is convey ed at high speed by the distance slightly less than one half of the frame interval in accordance with the size information obtained at the above Step S2 (Step S12, S4). By repeating the above steps, the images in respective frames can be sequentially and automatically printed. When it is judged that there is no more the negative film 2 at the Step 12, the rotation of the negative film driving roller 35 is automatically suspended to end the procedure. The center of the negative film 2 is detected at the center of the negative film carrier 32 in the foregoing statement, but the detection is by no means limited to the center but may be conducted at the portions near the center or the peripheries.

Automatic conveyance of the negative film 2 has been explained in the above. This invention method attempts to correspond further the frames of the negative film 2 with printed photographic paper sheets by either photographically printing identification data (e.g. 1, 2, 3, ... or A, B, C, ...) on the surface of the printed paper or recording the same on the reverse surface thereof while the negative film 2 is being conveyed by frames.

Figure 7:
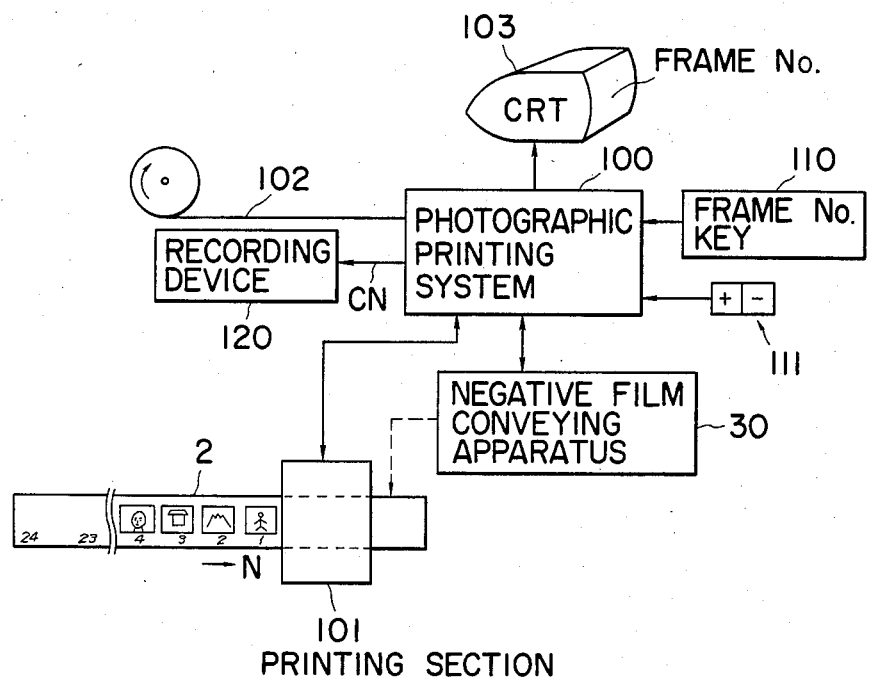
FIG. 7 is a block diagram to show an embodiment of a device which realizes this invention method.
Figure 8:
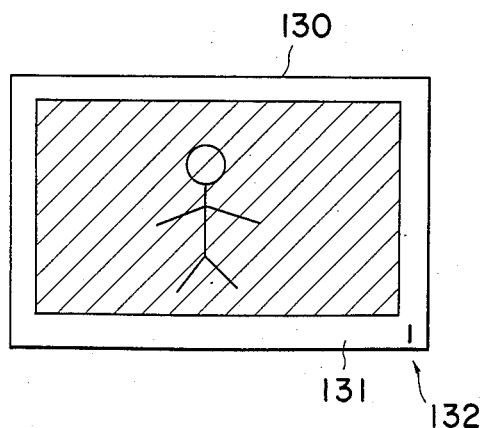
FIG. 8 is a view to show an embodiment of a print.

FIG. 7 shows an embodiment of this invention structure wherein the negative film 2 is conveyed by the negative film conveying apparatus 30 toward the printing section 101 of the photographic printing system 100 or in the direction N by frame feeding method described in the foregoing, a film number ("1" in this embodiment) is inputted by a frame number key 110 in correspondence to the first frame of the negative film 2, and at the same time, whether identification information should be added (+) or subtracted (−) is inputted by a feed direction key 111 as initial setting (the data should be added to the first frame in this embodiment). As the negative film conveying apparatus 30 conveys the negative film 2 consecutively by frames in the method mentioned above, the photographic printing system 100 obtains identification information CN ( in this embodiment the number 1, 2, 3, ... ) in accordance to the preset first frame number and the feeding direction, and sends the information CN to a recording device 120. The recording device 120 records (132) identification information CN on a vacant space 131 on the surface ( or reverse surface ) of a printed photographic paper sheet 130 with a well-known method as shown in FIG. 8 while the paper sheet is being printed at the printing section 101, and simultaneously displays the information CN at a CRT 103. The identification information CN is renewed every time one frame is conveyed by the negative film conveying apparatus 30 to enable recording on the printed photographic paper sheet the same number as the number of the frame irrespective of the number of printed sheets. The negative film 2 is inspected whether or not there is blurred or fogged images or unimaged frames by a separate means, and if such defects are detected, the defective frame is eliminated from printing. In such a case, the defective frame is conveyed to renew the identification information CN without recording (132). Therefore the images in frames of the negative film 2 are always co-related to the identification information CN recorded on the printed photographic paper sheet 130.

When the next negative film 2 is mounted for printing, the number of the first frame is inputted similarly by the frame number key 110. If the feeding direction is changed, the new direction is instructed by the feed direction key 111.

In the above embodiment, the first frame number and the feeding direction are inputted with key manually for each negative film in order to co-relate frame numbers which are displayed in arabic numerals in latent images on the side of a frame after development and the identification information on the printed photographic paper sheet with the same marks. However, if the identification number is used as a supplementary means to identify the printing order alone without correspondence between the frames and sheets, the number and direction do not need to be preset initially.

As described in the foregoing, as this invention method corresponds to the imaged frames on the negative film with printed sheets of photographic paper by automatically detecting the information of the printed image frames based on the initially set frame numbers and the feeding direction for each negative film, it can realize effective and precise photographic processing. As the printed sheets of photographic paper can easily be co-related to the frames of the particular images after the printing steps, if a particular frame of images should be reprinted for make-over at the laboratory or for the order to extra prints by a customer, it is simple to relate printed sheets to original imaged frames to thereby remarkably reduce mistakes which might otherwise be caused by confusion of numbers. Since this method can be realized with a simple structure, this method can be incorporated easily to a conventional photographic printing system.

It should be understood that many modifications and adaptations of the invention will become apparent to those skilled in the art and it is intended to encompass such obvious modifications and changes in the scope of the claims appended hereto.

What is claimed is:

1. A photographic printing method which automatically conveys an original film mounted on a negative film carrier by detecting frames for printing which is characterized in that number of the frames is either added or subtracted in accordance to the edge detection information for the imaged frames to obtain identification information for each of the frames so that the imaged frames of said original film are corresponded to printed sheets of photographic paper.

2. A photographic printing method as claimed in claim 1 wherein defective frames on said original film are detected and if such a defective frame is detected, said identification information alone is renewed without printing the images.

3. A photographic printing method as claimed in claim 1 wherein said identification information is recorded on either one of the surfaces of said printed sheets of photographic paper.

4. A photographic printing method as claimed in claim 1 wherein said identification information is information to identify the order of printing alone.

5. A photographic printing method as claimed in claim 2 wherein said defective frames are the frames which are out of focus, unimaged or fogged.

6. A photographic printing method which automatically conveys an original film mounted on a negative film carrier by detecting frames for photographic printing which is characterized in that an instruction of either addition to or subtraction from a first frame number and feeding direction is inputted as initial setting every time a new film roll is mounted, identification information corresponding to printed frames are obtained by either adding to or subtracting from the first frame number for each original film based on the information on detected edges of said original film as well as on the information on said feeding direction so that the frame numbers recorded on the side of said original film corresponding with printed sheets of the photographic paper with the same numbers.

7. A photographic printing method as claimed in claim 6 wherein said identification information is recorded on either one of the surfaces of printed sheets of the photographic paper.

8. A photographic printing method as claimed in claim 6 wherein said identification information is displayed by a display means.

9. A photographic printing method as claimed in claim 6 wherein the edge of an imaged frame on said original film is detected by an image sensor for image information detection of the original film.

10. A photographic printing method as claimed in claim 6 wherein said identification information are recorded by a recorder.

11. A photographic printing method as claimed in claim 8 wherein said display means is a CRT.

12. A photographic printing method as claimed in claim 7 wherein said identification information are recorded on vacant space on printed sheets of the photographic paper.

13. A photographic printing method as claimed in claim 6 wherein said identification information are in the form of numerals or alphabets.

* * * * *